(12) United States Patent
Stoman

(10) Patent No.: US 10,410,105 B1
(45) Date of Patent: Sep. 10, 2019

(54) CONTAINERS FOR AERIAL DRONE TRANSPORT OF MATERIALS, OBJECTS, OR PRODUCTS

(71) Applicant: Ingar LLC, Southlake, TX (US)

(72) Inventor: Karin Stoman, Southlake, TX (US)

(73) Assignee: INGAR LLC, Arlington, TX (US)

( * ) Notice: Subject to any disclaimer, the term of this patent is extended or adjusted under 35 U.S.C. 154(b) by 0 days.

(21) Appl. No.: 15/765,457

(22) PCT Filed: Oct. 31, 2017

(86) PCT No.: PCT/US2017/059411
§ 371 (c)(1),
(2) Date: Apr. 2, 2018

(87) PCT Pub. No.: WO2018/089236
PCT Pub. Date: May 17, 2018

Related U.S. Application Data

(60) Provisional application No. 62/421,205, filed on Nov. 11, 2016.

(51) Int. Cl.
*G06K 19/06* (2006.01)
*G06K 19/07* (2006.01)
(Continued)

(52) U.S. Cl.
CPC .......... *G06K 19/0723* (2013.01); *B64D 9/00* (2013.01); *B65D 25/20* (2013.01); *B65D 51/24* (2013.01); *G06K 19/06028* (2013.01); *G06K 19/06037* (2013.01); *B64C 39/024* (2013.01); *B64C 2201/128* (2013.01); *B65D 2203/06* (2013.01); *G06K 9/00664* (2013.01)

(58) Field of Classification Search
CPC ......... G06K 19/0723; G06K 19/06028; G06K 19/06037; G06K 9/00664; B64D 9/00; B65D 25/20; B65D 51/24; B65D 2203/06; B64C 37/024; B64C 2201/128
USPC .................................................. 235/492, 487
See application file for complete search history.

(56) References Cited

U.S. PATENT DOCUMENTS

| 2001/0028561 | A1* | 10/2001 | Pitts ........................ F21L 4/022 362/84 |
| 2011/0084162 | A1* | 4/2011 | Goossen ............... B64C 39/024 244/12.1 |
| 2015/0331427 | A1* | 11/2015 | Chaudary ............. B64C 39/024 244/17.13 |

* cited by examiner

*Primary Examiner* — Karl D Frech
(74) *Attorney, Agent, or Firm* — Timberline Patent Law Group PLLC; Mark Farrell

(57) ABSTRACT

A container for aerial drone transport includes a main body; a lid; a plurality of aerial drone grip elements organized in an aerial drone grip configuration; a plurality of visual aerial drone orientation markers carried by at least one external surface at predetermined locations relative to the plurality of aerial drone grip elements, which define a pickup orientation; and a first machine-readable code indicating a container serial number, container dimensions, weight carrying capacity, and/or the aerial drone grip configuration. The container can also include a second machine-readable code indicating a target aerial drone delivery address. The container can include an RFID tag, and possibly a sensing unit configured for sensing one or more types of signals. The container can be securely closed by closure mechanisms, including an elastic band structure having knob elements that can be inserted into and securely retained by aperture structures having two different cross-sectional areas.

12 Claims, 7 Drawing Sheets

(51) Int. Cl.
  _B64D 9/00_     (2006.01)
  _B65D 25/20_    (2006.01)
  _B65D 51/24_    (2006.01)
  _B64C 39/02_        (2006.01)
  _G06K 9/00_         (2006.01)

CONTAINERS FOR AERIAL DRONE TRANSPORT OF MATERIALS, OBJECTS, OR PRODUCTS

TECHNICAL FIELD

Aspects of the present disclosure relate to parcels, packages, boxes, or containers for carrying or housing objects to be transported and/or during transport by aerial drone. More particularly, aspects of the present disclosure relate to containers that are structurally designed to facilitate rapid and efficient aerial drone or aerial drone or aerial drone operator container recognition, capture, release, and transport.

BACKGROUND

Multiple companies are in the advanced stages of designing aerial drones to perform parcel transport or delivery. Aerial drone parcel transport can occur in various contexts, including aerial drone transfer of materials, objects, or products between Business to Business (B2B) entities, Business to Government (B2G) entities, Government to Government (G2G) entities, and/or Business to Consumer(s) (B2C). For instance, aerial drone parcel transport can be employed for product purchases, product returns/exchanges, or inter-organizational or intra-organizational material, object, or product transfers.

A need exists to provide individuals, businesses, and organizations that require aerial drone parcel transport with parcels, packages, boxes, or containers that are specifically designed in a manner that allows aerial drones and/or aerial drone operators to easily and safely identify and position inbound drones to effectively execute requested or scheduled container pickup and transport, and which aids the delivery of the containers to their intended destinations in an efficient, effective manner.

Since restrictions or constraints exist around dimensions of containers and their weight, there are challenges involved in effectively picking up and conveying containers by aerial drone. Standardized aerial drone containers do not yet exist. Moreover, neither single use nor multiple use/readily reusable containers that are structurally designed to facilitate rapid, reliable, and authenticatable aerial drone transport currently exist.

SUMMARY

Embodiments in accordance with the present disclosure are directed to containers that can provide valuable information to aerial drones, aerial drone operators, and/or aerial drone fleet owners regarding a container that is to be picked up from a target source location and delivered to a target destination location.

Embodiments in accordance with the present disclosure provide strong and reliable to parcels, packages, boxes, or containers that can be easily recognized and identified by inbound aerial drones and/or aerial drone operators, and which can be easily, securely, and reliably captured by or attached to aerial drones and release therefrom in association with automatic, automated, or semi-automated parcel pickup, transport, delivery. The unique design(s) of containers in accordance with various embodiments of the present disclosures enables aerial drones and/or aerial drone operators to correctly and possibly automatically (pre)adjust aerial drone container pickup mechanism(s) to the size and dimensions of a container for which aerial drone pickup and transport has been requested or scheduled.

Some container embodiments in accordance with the present disclosure include or carry a radio frequency identification (RFID) tag or other electronic device(s) or circuitry storing information and which are capable of communicating signals or data (e.g., radio frequency signals) encoding, indicating, specifying or electronically linked to the dimensions, grip configuration, and lift capabilities of the container. The RFID tag and/or other circuitry can be embedded in or attached (e.g., on a default basis) to a particular portion of the container, such as the lid, wall, or base thereof. Additionally or alternatively, when an aerial drone parcel pickup event is scheduled or arranged by a requestor or user with respect to a given container under consideration, the user can provide to a corresponding aerial drone service operator a unique code carried by the container (e.g., which is printed thereon, and/or which is encoded into the container's RFID tag) under consideration, where this code represents the dimensions, grip element configuration, and lift or weight carrying capabilities of the container.

Some container embodiments in accordance with the present disclosure include or carry a sensing unit configured for sensing or capturing (e.g., on a periodic basis) and storing a history of particular types of signals (e.g., environmental signals) to which the container is exposed, such as temperature; relative humidity; moisture; altitude or barometric pressure; vibration, impact forces, shock or acceleration; magnetic field; light intensity internal and/or external to the container; and/or sound. In particular embodiments, a sensing unit can be insertable into and removable/retrievable from the container, and can be electromagnetically or electronically coupled to an electronic/computing device such as a smart phone, tablet computer, laptop computer, or desktop computer for the retrieval of stored signal history therefrom.

In accordance with an embodiment of the present disclosure, a container structure for transport by airborne aerial drone includes: a main body comprising a set of sidewalls, a bottom coupled to the set of sidewalls, and a main opening opposite the bottom, which provide a predetermined container structure inner spatial volume into which objects are insertable through the main opening; a lid couplable or coupled to the main body and configured for closing the main opening of the main body; a plurality of aerial drone grip elements organized in an aerial drone grip configuration and shaped and dimensioned to accommodate structural counterpart aerial drone gripping mechanisms by which the container structure is carried by an aerial drone during aerial drone flight; a plurality of visual aerial drone orientation markers carried by at least one external surface of the container structure at predetermined locations relative to the plurality of aerial drone grip elements, which collectively define a container structure pickup orientation relative to the aerial drone; and a first machine-readable code disposed on an external surface of the container structure, which indicates or encodes a unique container structure serial number and at least one of container structure dimensions, container structure weight carrying capacity, and the aerial drone grip configuration.

At least one of the visual aerial done orientation markers can include or be an optically reflective material in visible and/or infrared optical wavelength bands. A visual aerial drone orientation marker can include or be made of optically reflective tape.

The container structure can include an inwardly protruding structure corresponding to each aerial drone grip element within the plurality of aerial drone grip element, which establishes a physical separation or barrier between an_ object disposed inside the container structure and an aerial drone gripping mechanism when the container structure is carried by the aerial drone.

The container structure can include a plurality of pre-positioned selectively exposable adhesive areas on an inner surface of the bottom of the container structure.

The container structure can include a set of first closure mechanisms carried by the lid, each of the first closure mechanisms including a first multi-width aperture structure having a first cross-sectional area and a second cross-sectional area different than the first cross-sectional area. The container structure can also include a set of second closure mechanisms carried by at least one sidewall within the set of sidewalls, each of the second closure mechanisms having a second multi-width aperture structure having includes a third cross-sectional area and a fourth cross-sectional area that is different than the third cross-sectional area, wherein each second closure mechanism corresponds to a counterpart first closure mechanism to form a counterpart first closure mechanism—second closure mechanism pair; and an elongate elastic cord or band structure corresponding to each first closure mechanism—second closure mechanism pair, wherein the elastic cord or band structure includes: a predetermined length of elastic material having a first end and a second end; a first knob element disposed at the first end of the length of elastic material and having a cross sectional area that is at least 10% smaller than the first cross sectional area and at least 20% larger than the second cross-sectional area, and which is configured for insertion into a first multi-width aperture structure through the first cross-sectional area and retention by the first multi-width aperture structure by the second cross-sectional area; and a second knob element disposed at the second end of the length of the elastic material and having a cross sectional area that is at least 10% smaller than the third cross sectional area and at least 20% larger than the fourth cross-sectional area, and which is configured for insertion into the second multi-width aperture structure through the third cross-sectional area and retention by the second multi-width aperture structure by the fourth cross-sectional area.

Additionally or alternatively, the container structure can have an elastic cord or band structure corresponding to each of the first closure mechanisms, the elastic cord or band element structure including: a predetermined length of elastic cord or band having a first end portion and a second end portion, the first end portion securely retained by or coupled to a predetermined container structure sidewall and extending outwardly through the predetermined container structure sidewall into container structure's external environment; and a first knob element disposed at a second end portion of the length of elastic material in the container structure's external environment, and having a cross sectional area that is at least 10% smaller than the first cross sectional area and at least 20% larger than the second cross-sectional area, and which is configured for insertion into a first multi-width aperture structure through the first cross-sectional area and retention by the first multi-width aperture structure by the second cross-sectional area.

The container structure can include a sensing unit having a power source, one of a state machine and a microcontroller, a memory, and a set of sensors comprising at least one of a temperature sensor, a relative humidity sensor; a moisture sensor, an altitude or barometric pressure sensor, a set of accelerometers and/or gyroscopes, a magnetometer, a photodetector or photodiode, and a microphone.

The container structure can include a second machine-readable code carried by an external surface thereof, which indicates or encodes a target destination address to which the container structure is to be transferred by the aerial drone, wherein the target destination address comprises a target destination aerial drone landing pad (ADLP) address comprising current or most-recent 2D or 3D geospatial location data for the target destination ADLP plus an as-manufactured ADLP serial number.

The container structure can include an RFID tag storing data corresponding to at least two or more of: container structure dimensions, container structure weight carrying capacity, container structure grip element configuration, the unique container structure serial number, a container structure manufacture date, a number of times the container structure has been transported by aerial drone, a most-recent date and time on which the container structure was transported by an aerial drone, and an electronic link to container structure history data. The container structure history data includes a set of aerial drone transport history codes or data comprising at least two of: a container structure user name or identifier (ID); container structure in-flight weight, an aerial drone container structure pickup address comprising by two dimensional (2D) or three dimensional (3D) geospatial location data corresponding to an aerial drone container structure pickup location, an aerial drone container structure drop-off address comprising 2D or 3D geospatial location data corresponding to an aerial drone container structure drop-off location, aerial drone flight time between the container structure pickup location and the container structure drop-off location, and a set of signal values sensed in-flight between the container structure pickup location and the container structure drop-off location.

BRIEF DESCRIPTION THE DRAWINGS

FIG. 1 is a schematic illustration showing an example of a container such as a foldable box that can be procured or obtained from local retailers or distribution outlets, e.g., by home/business owners or any user wishing to make use of a drone pick-up service. Containers can be designed in multiple sizes/dimensions, and any given container has the capability to hold contents up to an assigned maximum weight and size. In several embodiments, the lid of the box also includes a "peel and stick" piece of packaging tape already attached to the box.

FIG. 2 is a schematic illustration showing a container similar to that shown in FIG. 1, but with a different configuration of grips, grip elements, or grip structures than those shown in FIG. 1, allowing for easy engagement with an aerial drone's pickup mechanism(s) for secure container lift and transport operations. FIG. 2 also shows particular representative mechanisms for securely closing the lid of the container, such as with an elastic band attached to the lid.

DETAILED DESCRIPTION

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration.

Herein, an "aerial drone" can be defined as an unmanned aerial vehicle (UAV) configured or configurable for (a) airborne delivery of a parcel or package to a landing pad structure, apparatus, or device (hereafter "aerial drone landing pad" or "landing pad") at, on, or in which the aerial drone can securely deposit, release, or leave the parcel; and/or (b) airborne retrieval or pickup of a parcel or package from a surface, structure, apparatus, or device, which can be an aerial drone landing pad. In various portions of the description herein, the term "aerial drone" as used herein can be construed or defined as an unmanned aerial or airborne parcel delivery vehicle. In various embodiments, the term "aerial drone" can additionally or alternatively be construed or defined as an unmanned aerial or airborne parcel pickup or retrieval vehicle, in a manner readily understood by an individual having ordinary skill in the art in view of the description herein.

Usage of the words "top" and "bottom" in the description of containers herein are representative, for purpose of brevity and aiding understanding, and can be interchangeable, as a container top side or surface in a particular situation or embodiment can be a container bottom side or surface in another situation or embodiment, or a container lateral surface in yet another situation or embodiment, in a manner readily understood by individuals having ordinary skill in the relevant art.

Figure 1:
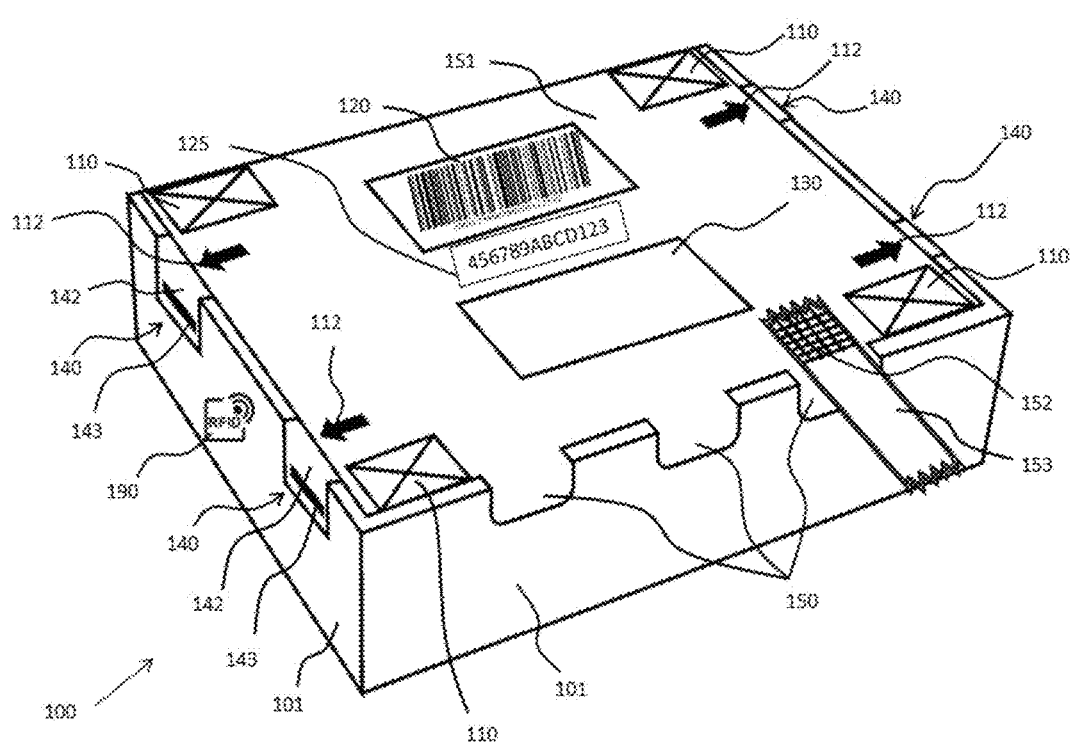

FIG. 1 is a perspective view of a container structure, container assembly, or container 100 such as a box in accordance with a representative embodiment of the present disclosure, which provides at least one internal volume or compartment into which one or more materials, objects, or products can be placed prior to aerial drone pickup and transport of the container 100 and the contents thereof from a container pickup site or location to a container delivery site or location. Such a container 100 can initially exist (e.g., as-packaged, ready for sale in a store) in a folded, highly compact, or pre-assembled form, and can be quickly and easily assembled into a final form ready for loading objects therein and aerial drone pickup thereof. For purpose of simplicity and clarity, the FIGs. herein show a representative rectangular or generally rectangular box-type container 100 (e.g., a six-sided box); however, embodiments in accordance with the present disclosure are not limited to containers 100 of such a shape. For instance, a container 100 in accordance with an embodiment of the present disclosure can have a shape that corresponds or generally corresponds to various types of non-rectangular polyhedra (e.g., a pyramid, a hexahedron, or an octahedron), a cylinder, or an ellipsoid, depending upon embodiment details.

A container 100 in accordance with an embodiment of the present disclosure can be made from one or more types of strong, light-weight materials, possibly depending upon the nature or type(s) of material(s), object(s), or product(s) within the container 100 that are under consideration for aerial drone transport, the total amount of time that the material(s), object(s), or product(s) will or will likely reside within the container 100, the environmental conditions to which the container 100 will or will likely be exposed during aerial drone transport (e.g., warm versus cold conditions, and/or dry versus wet conditions), the distance(s) and time interval(s) over which such aerial drone transport will occur or is likely to occur, and/or other factors (e.g., whether the container 100 needs to be water-resistant or waterproof, thermally insulated, or flame-retardant or fireproof).

In several embodiments, a simplified container 100 can be made using corrugated cardboard, which allows for easy assembly of the container 100 by the container user in preparation for a scheduled aerial drone container pickup. A container 100 can also or alternatively be made of other material(s) such as plastic. Furthermore, one or more portions of a container 100 can include or be made using other types of materials, such as one or more types of fabric, which can be supported by a set of frame elements or an internal scaffold. Portions of the container 100 can include, carry, or have embedded therein rib-like structural reinforcement members, such as length-wise and/or width-wise fabric, fiber, polymer or metallic ribs, struts, or rods; and/or web-like structural reinforcement elements, such as fabric, fiber, polymer, or metallic netting. Moreover, portions of a container 100 can include or be made using one or more materials providing particular thermal insulation properties, such as polystyrene (Styrofoam™), polyurethane form, cellulosic fiber, or metallic foil. A container 100 can additionally be made using or carrying structural elements providing vibration or shock resistance thereto. Portions of containers 100 in accordance with embodiments of the present disclosure can be made from or using natural, biodegradable, and/or recyclable/recycled materials, enhancing their environmental friendliness. Containers 100 in accordance with particular embodiments of the present disclosure can be color-coded in different manners to indicate different weight carrying capacities.

In various embodiments, a container 100 includes a main body 101 and closeable or removable lid 151, where the main body 101 when assembled provides a set of sidewalls (e.g., 4 sidewalls for a rectangular box-type container 100, or 6 sidewalls for a hexagonal box-type container 100, or a single cylindrical sidewall for a cylindrical container 100) defining outer sidewall surfaces and opposing internal or interior sidewall surfaces; a bottom that is couplable or coupled to the set of sidewalls, and which has an outer surface and an internal or interior surface; and a main opening (e.g., a top opening), which typically opposes and is the same size or approximately the same size as the bottom. The main body 101 provides or defines a predetermined internal, inner, or interior spatial volume into which one or more objects can be inserted. This internal spatial volume, and hence the main body 101 itself, can be covered or sealed by way of positioning the lid 151 over the main opening, in a manner readily understood by individuals having ordinary skill in the relevant art.

The container 100 can further include multiple closure structures or features 150 carried by the main body 101 and/or the lid 151 by which the lid 151 can matingly or securely engage with the main body 101. For instance, such structural features 150 can include closures or closure elements such as tabs or tongues on the lid 151, which fit into or matingly engage with counterpart recesses formed in the main body 101. Depending upon embodiment details, the lid 151 and the main body 101 can be entirely separate/separable from each other; or the lid 151 can be pre-attached or connected to the main body 101 along a common interface or border therebetween (e.g., at or along one or more portions of an upper rear edge or border of a back sidewall of the container 100).

In some embodiments, the container 100 is pre-provided (e.g., as-manufactured) with one or more strips of an adhesive material 152 such as packaging tape, where each strip of adhesive material 152 is pre-attached to the container 100 along a predetermined partial length thereof, and each strip of adhesive material 152 further includes a protective strip of peel-off material by which the remainder of the strip of adhesive material 152 can be secured or adhered to the container 100 (e.g., after the container 100 has been loaded with material(s), object(s), or product(s), and the container 100 is to be sealed). The protective strip prevents adhesion of the adhesive material 152 to another surface of the container 100 (e.g., the main body 101 of the container 100) until the protective strip is removed. Once the protective strip has been removed, the portion of the adhesive material 152 from which the protective strip has been removed forms a "peel and stick" 153 section of the adhesive material 152 that can be quickly and conveniently adhered to the container 100, for instance, along sections of the container's main body 101. In a representative embodiment, one or more strips of adhesive packaging tape 152 can be pre-attached to the lid 151 of the container 100 along partial lengths of such strips of tape 152, and the user can quickly remove the protective strip from the pre-attached adhesive packaging tape 152, and further secure the closure of the lid 151 to main body 101 of the container 100. Such strips of adhesive tape 152 can be pre-attached to the box/container 100 at multiple positions (e.g., 3 or more positions).

In addition or as an alternative to the foregoing, in certain embodiments one or more strips of adhesive material 152 can include or be Velcro™ ("hook and loop" type) adhesive strips, each of which has a first section, first end, or head portion pre-attached to particular portions of the container 100 such as predetermined regions of the lid 151, and which has a second section such as a tail portion that can be secured to a counterpart Velcro™ adhesive strip carried by the container's main body 101, by which the container 100 can be securely sealed.

In various embodiments, particular or predetermined areas on the container 100 carry one or more types of machine-readable, optically or visually detectable, or visible aerial drone orientation markers 110, 112, which can facilitate orienting or positioning an inbound aerial drone relative to the container and guiding the inbound aerial drone to a required position to securely capture and pick up the container 100 prior to container transport. Such markers 110, 112 are shown in a particular representative manner in FIG. 1, but can take various forms and reside at different container locations depending upon embodiment details. For instance, aerial drone orientation markers 110, 112 can be of the same size and shape, or at least some of such markers 110, 112 can exhibit different sizes or shapes (e.g., a container 100 can include rectangular, triangular, round, and/or octagonal markers). The markers 110, 112 can be pre-printed on, embedded in, or pre-attached to one or more exterior container surfaces, such as the lid 151 of the container 100. In multiple embodiments, at least three locations on a container 100 (e.g., areas on at least three corner regions or each corner region of the lid 151 of a container 100 that has at least four sides or sidewalls; or three distinct locations on the lid 151 of a cylindrical container 100) carry a set of aerial drone orientation markers 110, 112, which can provide information to an aerial drone and/or aerial drone operator to indicate or define a reference orientation at which the aerial drone can or should be positioned relative to the container 100 to aid rapid and secure container pickup and transport by the aerial drone. Such markers 110, 112 can be designed, fabricated, or structured in a manner that enhances their optical or visual detectability or distinctiveness relative to other portions of the container 100 and/or each other. For instance, aerial drone orientation markers 110, 112 can be colored or color-coded and/or optically or visually patterned (e.g., different markers 110, 112 can exhibit different colors; one or more markers can carry or be made of optically reflective materials, such as a plastic or adhesive tape based multi-directional reflector or retro-reflector; and/or particular markers can exhibit different optical reflectivity, including with respect to one or more optical wavelength bands). In certain embodiments, one or more of such markers 110, 112 can include or be made using an optically reflective material such as reflective tape.

In various embodiments, a container 100 includes a set of aerial drone gripping or grip structures or elements 140 (e.g., a plurality of grip elements 140, such as at least three grip elements 140) by which an aerial drone's container gripping, grasping, holding, or attachment mechanism(s) can quickly, securely, and selectively engage with the container 100 for purpose of picking up the container 100 and transporting the container 100 to a target delivery destination. In general, a container 100 of any given design in accordance with an embodiment of the present disclosure is structured to provide or have a predetermined configuration of grip elements 140. Depending upon embodiment details, such grip elements 140 can include or be openings, recesses, channels, grooves, gaps, material loops (e.g., wire, plastic, or wire-reinforced plastic loops), handles, and/or other types of structures carried by the container 100, with or into which portions of an aerial drone's container gripping mechanism(s) can rapidly and securely engage when the aerial drone is properly oriented with respect to the container's aerial drone orientation markers 110, 112. The grip elements 140 can be strategically positioned around peripheral portions of the container 100 in multiple manners (e.g., a first pair of grip elements 140 can be disposed on upper or lower portions of a given container sidewall, and another pair of grip elements 140 can be disposed on upper or lower portions of an opposite container sidewall), and can be made of durable, high strength material such as plastic and/or metal (e.g., wire-reinforced plastic). Grip elements 140 can be shaped and dimensioned to accommodate aerial drone grippers or gripping mechanisms having a particular or counterpart shape and dimension, e.g., in a mating engagement manner, such as a male-female structural relationship. In a representative non-limiting embodiment, a grip element 140 includes a plate or sheet of material 142 having at least one slot 143 formed therein. Additionally or alternatively, as shown in FIGS. 2 and 3, a grip element 140 can include or be an aperture 145 formed at a predetermined location in a container sidewall.

Figure 2:
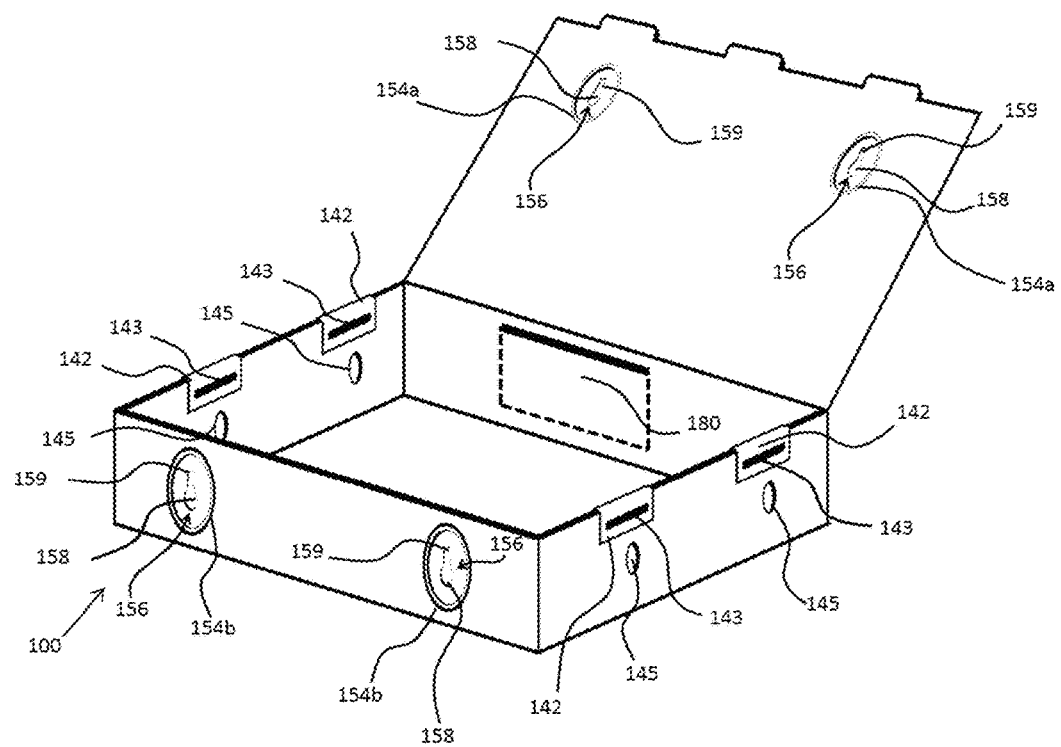
Figure 3A:
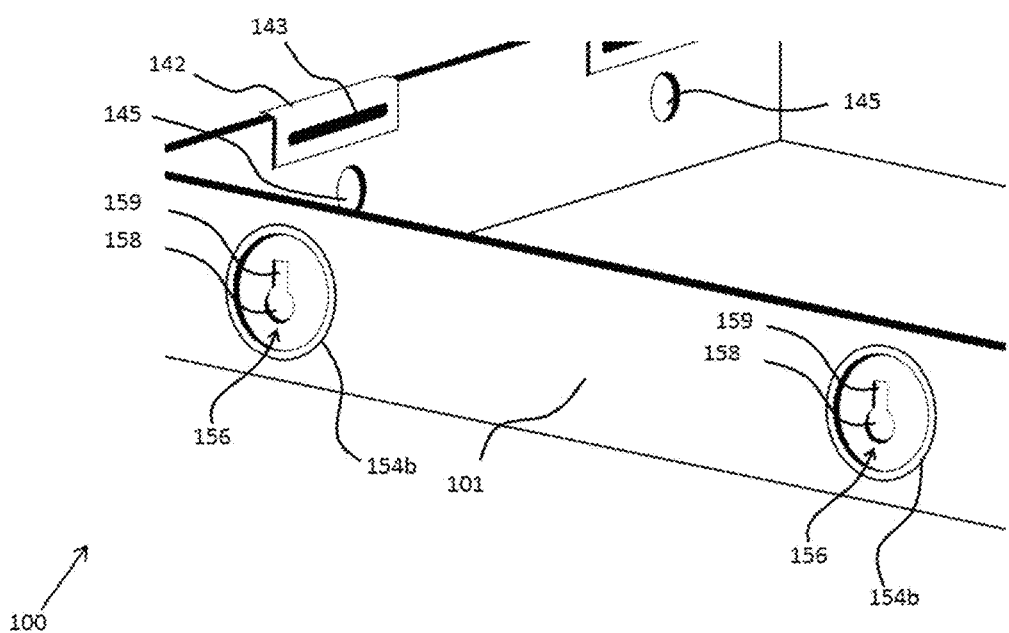
FIGS. 3A and 3B are close-up schematic illustrations showing aspects of a representative lock, latch, or closure mechanism of the container shown in FIG. 2.
Figure 3B:
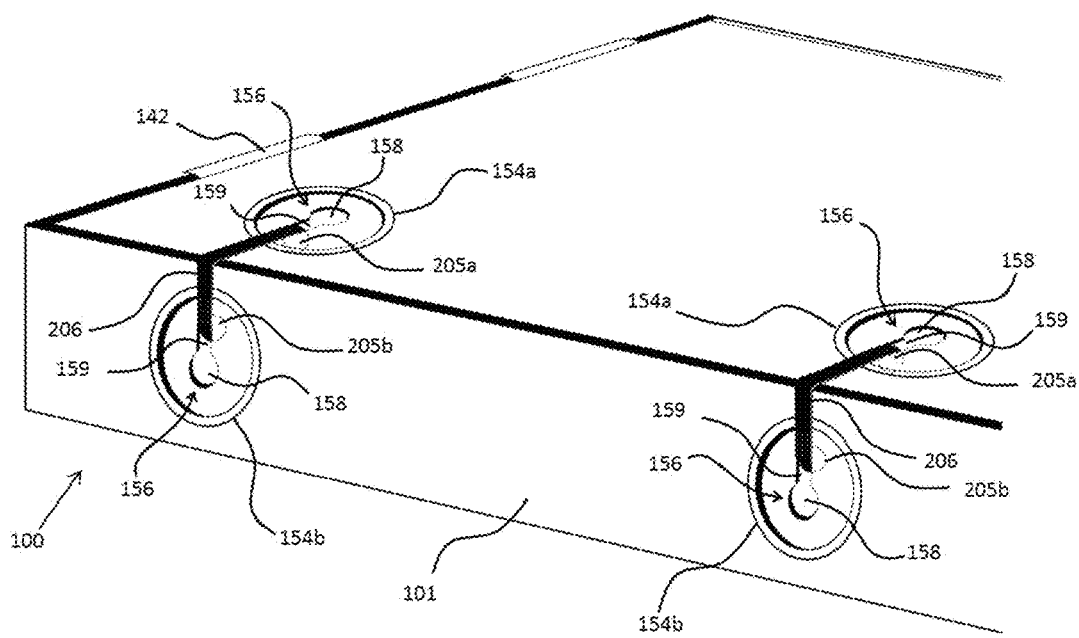

As also indicated in FIGS. 2, 3A, and 3B, some containers 100 in accordance with the present disclosure include one or more types of lock, latch, and/or 20, structures, devices, or mechanisms for securing, locking, latching, retaining, and/or closing the lid 151 in a closed position relative to or against the main body 101. Such lock mechanisms can be carried by predetermined portions of the lid 151 and the main body 101, and can be structured to facilitate or enable rapid and convenient container opening and closure.

For instance, in a representative embodiment a closure or lock member or mechanism includes a first or upper set of plates 154a, each of which is carried by or mounted in the lid 151; and a corresponding or counterpart second or lower set of plates 154b, each of which is carried by or mounted in a front sidewall, edge, or face of the main body 101 of the container 100. In the embodiment shown, the container 100 includes a pair of first/upper plates 154a, and a corresponding or counterpart pair of second/lower plates 154b. Other embodiments can have another number of first/upper and second/lower plates 154a,b.

Each plate 154a,b can be formed of a thin sheet of material such as rigid or generally rigid plastic or metal, and each plate 154a,b includes an multi-width or dual-width aperture structure 156 therein, which in several embodiments is keyhole-shaped. Such a keyhole shaped aperture 156 includes a first, large, or generally elliptical/circular aperture portion 158, and a second, narrow, slot-like, or generally rectangular aperture portion 159 that extends away from the generally elliptical/circular aperture portion 158. The width, diameter, or cross-sectional area of the generally circular aperture portion 158 is larger than the width of the generally rectangular aperture portion 159.

Figure 4:
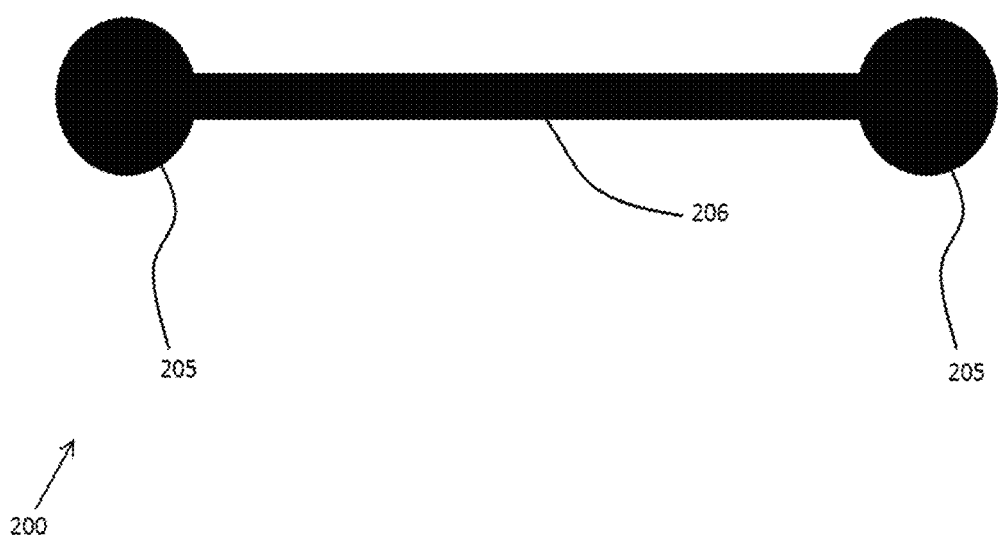
FIG. 4 is a schematic illustration of an elastic band that is used to securely and tightly close the lid to the body of a container in accordance with an embodiment of the present disclosure, and which allows for fast and easy operation between users that reuse containers for pending drone pick-ups.

A given first plate 154a carried by the lid 151 and a corresponding or counterpart second plate 154b carried by the front sidewall, edge, or face of the container's main body 101 can be securely and resiliently coupled, linked, or tied together by way of an elastic cord, band, or band structure 200 such as that shown in FIG. 4, in a manner indicated in FIG. 3B. More particularly, an elastic band 200 can be manufactured as a single elongate unit that includes a resilient or resiliently elongatable/stretchable shaft portion 206 and a set of knob, button, ball, or handle structures or elements 205, for instance, balls or ball like structures attached to the shaft portion 206, e.g., at the shaft portion's terminal ends. In the embodiment shown in FIGS. 3B and 4, the elastic band 200 thus includes a first knob 205a and a second knob 205b disposed at opposite ends of the elastic band 200. The diameter or cross-sectional area of each knob 205a,b is slightly smaller (e.g., at least 10-20% smaller) than the diameter of the generally circular aperture portion 158 of each plate's keyhole-shaped aperture 156, but at least slightly larger (e.g., at least 20-50% larger) than the width of the generally rectangular aperture portion 157 of each plate's keyhole-shaped aperture 156. An individual having ordinary skill in the art will understand that the knobs 205a,b need not be spherical or elliptical as shown in FIG. 4, but can have another type of shape such as a mushroom-type, rectangular, or other shape.

For a given first plate 154a, a first knob 205a of an elastic band 200 can be inserted into and through the generally circular aperture portion 158 of the first plate's keyhole-shaped aperture 156. The elastic band 200 can then be pulled such that the first knob 205a is drawn underneath or behind the first plate 154a in a direction away from the generally circular aperture portion 158, toward and along the generally rectangular aperture portion 159. As a result, the first knob 205a is securely retained behind the first plate 154a because the width of the generally rectangular aperture portion 159 is less than the width, diameter, or cross-sectional area of the first knob 205a.

The elastic band 200 can then be stretched such that its second knob 205b can be inserted into and through the generally circular aperture portion 158 of the keyhole-shaped aperture 156 of a corresponding or counterpart second plate 154b on the front wall of the container 100. Once the second knob 205b has been inserted into and through the generally circular aperture portion 158 of the second plate's keyhole-shaped aperture 156, the partial relaxation or partial release of elastic tension in the elastic band 200 automatically causes the second knob 205b to be drawn beneath the second plate 154b away from the second plate's generally circular aperture portion 158, toward and along the second plate's generally rectangular aperture portion 159. As a result, the second knob 205b is retained behind the second plate 154b because the width of the second plate's generally rectangular aperture portion 159 is less than the width, diameter, or cross-sectional area of the second knob 205b.

Consequently, the first plate 154a and the second plate 154b are securely drawn toward each other and retained in position relative to each other by way of elastic tension in the elastic band 200 in combination with the retention of the first knob 205a against the backside of the first plate 154a by the generally rectangular aperture portion 159 of the first plate 154a, and the retention of the second knob 205b against the backside of the second plate 154b by the generally rectangular aperture portion 159 of the second plate 154b.

An additional elastic band 200 can be used to securely and resiliently draw another first plate 154a and its corresponding or counterpart second plate 154b together in an analogous or identical manner.

After a first/upper plate 154a and a second/lower plate 154b have been resiliently drawn towards each other and retained in position with respect to each other by way of an elastic band 200, in response to a sufficient pulling force applied to an end region of the elastic band 200, a given knob 205a,b can be drawn away from the generally rectangular aperture portion 159 of the plate 154a,b beneath which it has been retained and pulled toward, to, and through the generally circular aperture portion 158 of the plate 154a,b, such that the knob 205a,b can be removed or released from the plate 154a,b as part of releasing the lid 151 from its locked or latched position relative to the main body 101, thereby facilitating or enabling container unlocking or opening.

In multiple embodiments, at least one portion of the container 100 such as the lid 151 carries a first machine-readable, optically/visually detectable, or electromagnetically detectable code 120, such as a first quick response (QR) code or barcode, which encodes, indicates, specifies, or electronically links to the following information for the container 100: (a) container dimensions (e.g., exterior or external dimensions); (b) container weight carrying capacity (e.g., maximum container weight limitations); (c) container grip element configuration; and/or (d) possibly other information (e.g., a unique container serial number, and/or as-provided or default container sensing unit capabilities). This first machine-readable code 120 can be referred to or defined as a drone box capture code (DBCC) or a drone box lift code (DBLC). The DBLC can be pre-printed or pre-adhered to the exterior surface of the lid 151 at a predetermined location, for instance, relative to the container's set of aerial drone orientation markers 110, 112, such that the DBLC is visible to and capturable by an inbound aerial drone's camera or optical reader. Once the inbound aerial drone captures the container's DBLC and the information corresponding thereto is decoded or retrieved, the inbound aerial drone can verify that it is appropriately equipped to capture and carry the container 100 under consideration, and pre-adjust or adjust (e.g., automatically pre-adjust) the positions of its container gripper(s)/gripping mechanism(s) accordingly to aid rapid and secure container pickup operations, and subsequently displace (e.g., automatically displace) its container gripper(s)/gripping mechanism(s) across an appropriate distance and in appropriate directions for securely gripping the container 100.

In addition or as an alternative to the foregoing, an alphanumeric DBLC 125 can be provided or printed on the container 100, such as proximate or adjacent to (e.g., below) the QR code/barcode DBLC 120, such that the container user can provide the alphanumeric DBLC 125 to an aerial drone operator (e.g., by way of an image capture operation involving user smartphone or tablet computer capture of the alphanumeric DBLC 125, and the transfer of the image of alphanumeric DBLC 125 to an aerial drone operator; or user verbal communication of the alphanumeric DBLC 125 to the aerial drone operator).

Containers 100 in accordance with various embodiments of the present disclosure can additionally carry an RFID tag 190, which can be carried by, attached to, or embedded into a particular container sidewall, the container's base, or the lid 151. The RFID tag 190 stores information specific to the container 100 by which it is carried, for instance, (a) container dimensions; (b) container weight carrying capacity; (c) container grip element configuration; and (d) possibly other information, such as one or more of: a unique container serial number, which ideally or typically should match that specified by the first QR code; a container manufacture date; as-provided or default container sensing unit capabilities; a number of times the container 100 has been transported by aerial drone to date; a most-recent date and time on which the container 100 was transported by an aerial drone; and particular types of container history data and/or an electronic link (e.g., a World Wide Web link) thereto, which can include container manufacture data and/or aerial drone transport history codes or data corresponding to the container 100. The container manufacture data can indicate a manufacturing facility, date, and time at which the container 100 was manufactured. The aerial drone transport history codes or data can provide or correspond to a history of aerial drone transport events for the container 100, for instance, one or more of: a container user name or identifier (ID); an aerial drone container pickup location (e.g., indicated by two dimensional (2D) or three dimensional (3D) geospatial location data, such as by way of Global Positioning Satellite (GPS) coordinates and altimeter data, and/or a unique aerial drone landing pad (ADLP) address or identifier from which the container 100 was picked up, where the ADLP address includes current or most-recent 2D or 3D geospatial location data for the ADLP plus a unique ADLP identifier such as an as-manufactured ADLP serial number); an aerial drone container drop-off location (indicated in a corresponding manner); container in-flight or in-transport weight; aerial drone flight time; and a set of values for one or more types of sensed signals (e.g., temperature) detected by a sensing unit carried by the container 100, for (a) one or more aerial drone flights, (b) specifically registered or verified/verifiable/authenticated/authenticatable aerial drone flights, or (c) each aerial drone flight by which the container was transported by an aerial drone from a target pickup location to a target destination location. Some or all of the information stored in the RFID tag 190 can be stored or recorded as part of a blockchain transaction. In some embodiments, at least some information stored in the RFID tag 190 can additionally or alternatively included or encoded in the first QR code (e.g., the first machine-readable code 120 can include or encode the electronic link to container history data and/or other information stored in the RFID tag 190).

An aerial drone, a stand-alone container handling system, and/or an ADLP that includes an RFID reader can read the contents of the container's RFID tag 190; and in some embodiments an aerial drone, a stand-alone container handling system, and/or an ADLP that includes an RFID reader/writer can write one or more portions of such information to the RFID tag 190, possibly in association with communication with one or more remote servers (e.g., container transport scheduling, confirmation and/or authentication servers).

A container 100 additionally provides or includes at least one delivery address area 130, such as a predetermined portion of the lid 151, at which container delivery address information can be provided, indicated, attached, or specified by the user. In some embodiments, the delivery address area 130 can contain a second machine-readable code such as a QR code or barcode, which identifies a unique ADLP address or target destination ADLP to which the container is to be delivered. Further representative details of ADLP addresses are described in published International Patent Application WO2016196093, entitled "Systems, Methods, and Apparatuses for Managing Aerial Drone Parcel Transfers," which has an international filing date of 24 May 2016, and which is incorporated herein by reference in its entirety. Such an ADLP address can be electronically determined by way of a computerized process involving user identification of a given target ADLP to which the container 100 is to be delivered, retrieval of the ADLP's unique ADLP address from a database, the generation of the machine-readable code corresponding thereto, and printing of this machine-readable code, for instance, as part of a label. Alternatively, users can print from an online retailer or company website a target shipping address to which the container 100 should be delivered.

In certain embodiments, the delivery address area 130 includes or has associated therewith a preattached plastic sleeve or envelope into which container delivery address information can be placed, such that the container delivery address information is visible to or readable by an aerial drone's camera through a see-through plastic window that forms a portion of the sleeve or envelope.

In still other embodiments, container delivery address information or an electronic link thereto can be written to the container's RFID tag, such that an RFID reader associated with an aerial drone or an aerial drone operator can obtain the address to which the container 100 is to be delivered, e.g., a target ADLP address, by way of an RFID tag read operation.

Figure 5:
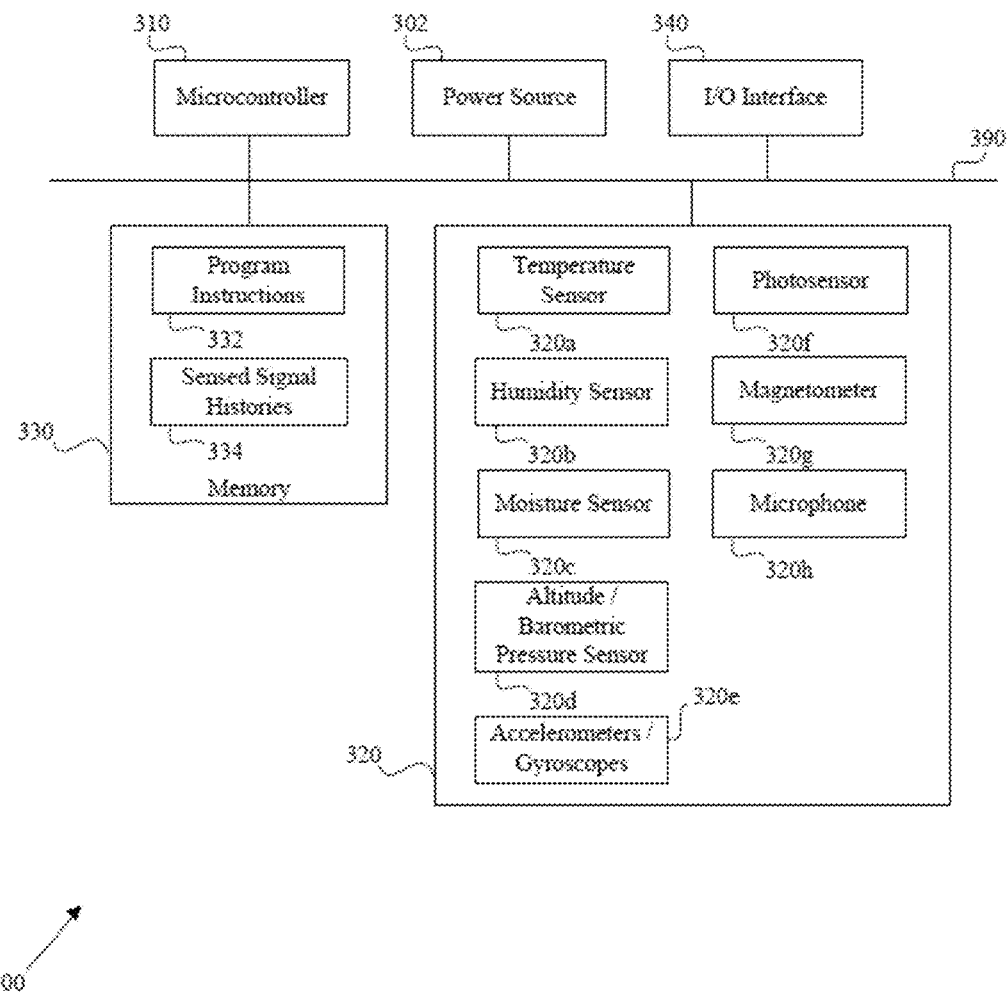
FIG. 5 is a schematic illustration of a sensing unit in accordance with an embodiment of the present disclosure.

As indicated above, in some embodiments a container 100 can include or have associated therewith a sensing unit, which is configured for sensing particular types of signals corresponding to conditions to which the container 100 is exposed. FIG. 5 is a block diagram of a representative sensing unit 300 in accordance with an embodiment of the present disclosure, which includes a power source 302 such as a battery (e.g., a rechargeable battery); a state machine or microcontroller 310; a set of sensors or sensing elements 320 configured for capturing or sensing one or more types of signals, where the set of sensing elements 320 includes conventional signal conditioning circuitry associated therewith; a memory 330 in which program instruction sets 332 executable by the microcontroller 310 and one or more sensed signal histories 334 can reside; and an input/output (I/O) interface (e.g., a universal serial bus (USB) type of interface) 340 by which sensed signal histories can be communicated to other electronic/computing devices. Elements of the sensing unit 300 can be coupled together by way of a common set of signal communication links or lines such as a bus 390. Depending upon embodiment details, the set of sensors 320 can include one or more of a temperature sensor 320a; a relative humidity sensor 320b; a moisture sensor 320c; an altitude or barometric pressure sensor 320d; a set of accelerometers and/or gyroscopes 320e; a magnetometer 320g; a photodetector or photodiode 320f; and a microphone 320h.

Program instructions stored 332 in the memory 330 and executable by the microcontroller 310 can periodically (e.g., once every k seconds or minutes, possibly depending upon remaining battery life, and possibly starting from when the sensing unit 300 is activated by a switch or button corresponding thereto, and the container 100 has been closed as indicated by the sensing unit's photodiode) direct or manage the capture or acquisition of signals corresponding to the current environmental conditions to which the container 100 is exposed, and add the most-recently captured or acquired signals to a sensed signal history stored in the memory 330. In some embodiments, certain types of sensed signals can be captured more or less frequently than other types of sensed signals.

Sensed signal histories can be useful in situations in which the nature, properties, functionality, or viability of the material(s), object(s), or product(s) transported can be adversely affected by environmental conditions that fall outside of an acceptable or anticipated range, for instance, when transporting medications of living things (e.g., plant seedlings or tropical fish), even when using a container 100 constructed of thermally insulating materials.

In a number of embodiments, the sensing unit 300 is an insertable/removable/attachable/detachable unit with respect to the container 100. For instance, the sensing unit 300 can include a u-shaped or generally u-shaped hook member or tongue (e.g., extending from or along a backside thereof) that is selectively insertable/inserted into and removable/removed from a particular internal portion of the container 100, such as a predetermined sensing unit recess, slot, pocket, or cavity 180 formed in a wall of the container 100 in a manner shown in FIG. 2, or formed in the container's base or lid 151. Such insertion of the sensing unit 300 into and removal of the sensing unit 300 from the container 100 can occur in a slidable manner. In other embodiments, the sensing unit 300 can carry a peel-off adhesive element on a backside thereof, by which the sensing unit 300 can be adhered to a portion of the interior of the container 100. In still further embodiments, the container 100 can include an internally-mounted bag element (e.g., a mesh bag with a drawstring and barrel clip) into which the sensing unit 300 can be selectively inserted and removed.

Figure 6:
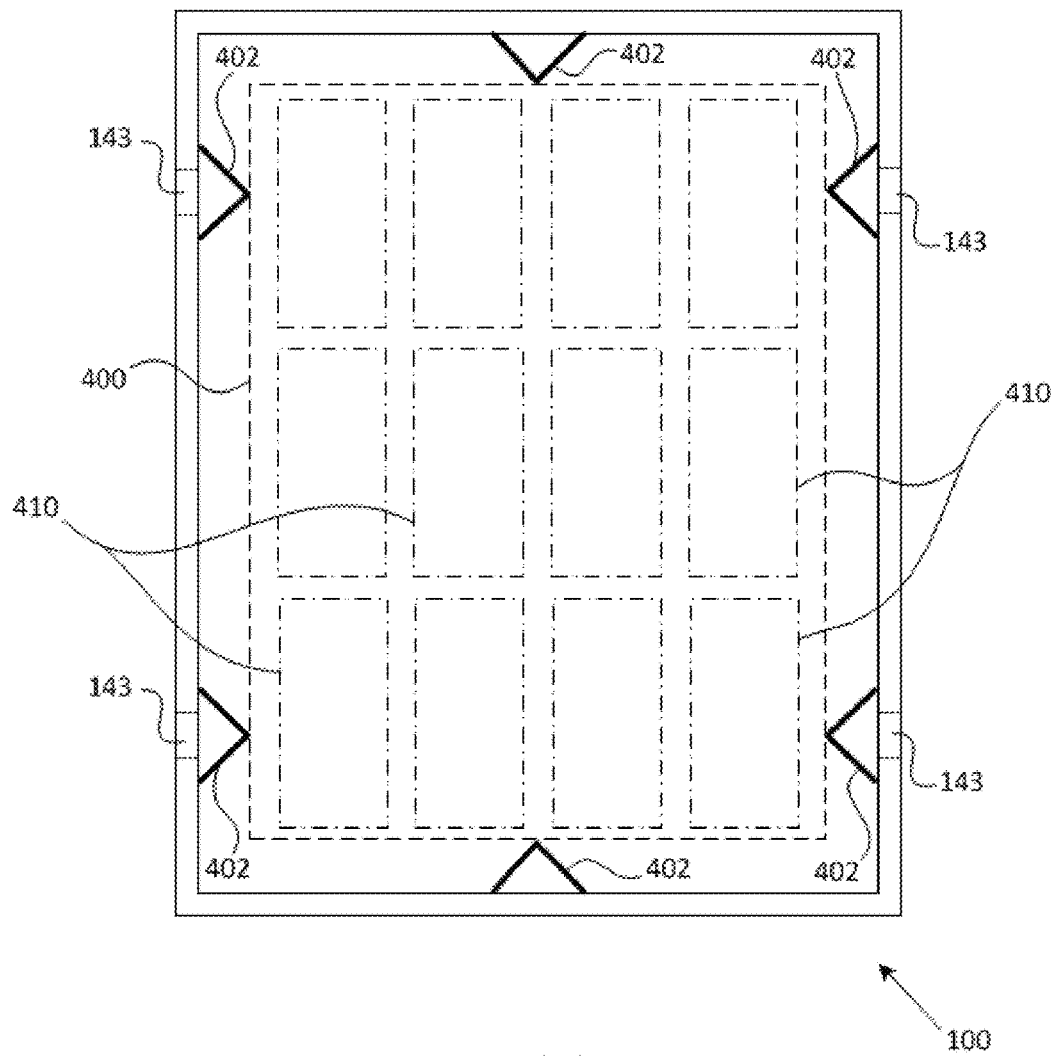
FIG. 6 is a top view showing a representative interior of a container that includes spacing elements that prevent objects disposed in the container from coming into direct contact with aerial drone grippers or gripping mechanisms in accordance with an embodiment of the present disclosure.

In some embodiments as shown in FIG. 6, containers 100 can include spacing or separation elements or members 402, such as inwardly protruding structures, ribs, or humps (e.g., v-shaped or u-shaped structures), disposed inside the container 100 around the grip elements 140 or slots 143 by which an aerial drone captures and holds the containers, which prevent objects inside the container 100 from hitting, sliding into, directly abutting, or directly contacting those portions of the aerial drone (e.g., mechanical grippers, arm, or fingers) that grasp or grip and pick up the container 100. For instance, for containers 100 that include grip elements 140 or slots 143 by which an aerial drone's gripper(s) can hold the container 100, spacing elements 402 can be disposed to surround such slots 143. Additional spacing elements 402 can also be disposed along other sidewalls of the container 100 that omit grip elements 140 or slots 143, in order to establish or define a predetermined inner region, area, or confinement zone 400 inside the container 100 within which objects are spatially constrained or confined.

In addition or as an alternative to the foregoing, predetermined portions of one or more interior surfaces of the container 100, such as the container's interior bottom surface, can include selectively exposable adhesive areas 410, which can be initially covered by a plastic film that can be selectively peeled off (e.g., by robotic container loading equipment or a human container user in association with loading the container with one or more objects) to expose adhesive areas at particular locations within the container 100. Such adhesive areas can be implemented by way of "peel and stick" adhesive tape or film areas that are prepositioned inside the container 100 during container manufacture, in a manner readily understood by individuals having ordinary skill in the art. Objects loaded into the container 100 can selectively be placed onto exposed adhesive areas, and thus more securely retained or held in place by the adhesive composition on or against which they reside.

Aspects of particular embodiments of the present disclosure address at least one aspect, problem, limitation, and/or disadvantage associated with conventional containers and their use in aerial drone deliveries and/or transfers. While features, aspects, and/or advantages associated with certain embodiments have been described in this disclosure, other embodiments may also exhibit such features, aspects, and/or advantages, and not all embodiments need necessarily exhibit such features, aspects, and/or advantages to fall within the scope of the present disclosure. It will be appreciated by a person of ordinary skill in the art that particular aspects of the above-disclosed systems, devices, components, processes, or alternatives thereof can be combined into other different systems, devices, components, processes, and/or applications. In addition, by a person having ordinary skill in the art can make various modifications, alterations, and/or improvements to one or more embodiments disclosed herein, where such modifications, alterations, and/or improvements remain within the scope of the present disclosure and the claims set forth below.

The invention claimed is:

1. A container structure for transport by airborne aerial drone, comprising:
   a main body comprising a set of sidewalls, a bottom coupled to the set of sidewalls, and a main opening opposite the bottom, which provide a predetermined container structure inner spatial volume into which objects are insertable through the main opening;
   a lid couplable or coupled to the main body and configured for closing the main opening of the main body;

a plurality of aerial drone grip elements organized in an aerial drone grip configuration and shaped and dimensioned to accommodate structural counterpart aerial drone gripping mechanisms by which the container structure is carried by an aerial drone during aerial drone flight;

a plurality of visual aerial drone orientation markers carried by at least one external surface of the container structure at predetermined locations relative to the plurality of aerial drone grip elements, which collectively define a container structure pickup orientation relative to the aerial drone;

a first machine-readable code disposed on an external surface of the container structure, which indicates or encodes a unique container structure serial number and at least one of container structure dimensions, container structure weight carrying capacity, and the aerial drone grip configuration; and an inwardly-protruding, structure corresponding to each aerial drone grip element within the plurality of aerial drone grip elements, wherein each inwardly-protruding structure establishes a physical separation or barrier between an object disposed inside the container structure and an aerial drone gripping mechanism when the container structure is carried by the aerial drone.

2. The container structure of claim 1, wherein at least one of the visual aerial done orientation markers comprises an optically reflective material in visible and/or infrared optical wavelength bands.

3. The container structure of claim 1, wherein at least one of the visual aerial drone orientation markers comprises optically reflective tape.

4. The container structure of claim 1, further comprising an RFID tag storing data including container structure grip element configuration and the unique container structure serial number.

5. The container structure of claim 4, further comprising a sensing unit having:
  a power source;
  one of a state machine and a microcontroller;
  a memory; and
  a set of sensors comprising at least one of a temperature sensor, a relative humidity sensor, a moisture sensor, an altitude or barometric pressure sensor, a set of accelerometers and/or gyroscopes, a magnetometer, a photodetector or photodiode, and a microphone.

6. The container structure of claim 4, wherein the RFID tag further stores data corresponding to at least two of: a number of times the container structure has been transported by aerial drone, a most-recent date and time on which the container structure was transported by an aerial drone, and an electronic link to container structure aerial drone transport history data.

7. The container structure of claim 6, wherein the container structure history data includes a set of aerial drone transport history codes or data comprising at least two of: a container structure user name or identifier (ID); container in-flight weight; an aerial drone container structure pickup address comprising two dimensional (2D) or three dimensional (3D) geospatial location data corresponding to an aerial drone container structure pickup location; an aerial drone container structure drop-off address comprising 2D or 3D geospatial location data corresponding to an aerial drone container structure drop-off location; aerial drone flight time between the container structure pickup location and the container structure drop-off location; and a set of signal values sensed in-flight between the container structure pickup location and the container structure dropoff location.

8. The container structure of claim 1, further comprising a plurality of prepositioned, selectively exposable adhesive areas on an inner surface of the bottom of the container structure.

9. The container structure of claim 1, further comprising a set of first closure mechanisms carried by the lid, each of the first closure mechanisms including a first multi-width aperture structure having a first cross-sectional area and a second cross-sectional area different than the first cross-sectional area.

10. The container structure of claim 9, further comprising:
  a set of second closure mechanisms carried by at least one sidewall within the set of sidewalls, each of the second closure mechanisms including a second multi-width aperture structure having includes a third cross-sectional area and a fourth cross-sectional area that is different than the third cross-sectional area, wherein each second closure mechanism corresponds to a counterpart first closure mechanism to form a counterpart first closure mechanism—second closure mechanism pair; and
  an elongate elastic cord or band structure corresponding to each first closure mechanism—second closure mechanism pair, wherein the elastic cord or band structure comprises:
    a predetermined length of elastic material having a first end and a second end;
    a first knob element disposed at the first end of the length of elastic material and having a cross sectional area that is at least 10% smaller than the first cross sectional area and at least 20% larger than the second cross-sectional area, and which is configured for insertion into a first multi-width aperture structure through the first cross-sectional area and retention by the first multi-width aperture structure by the second cross-sectional area; and
    a second knob element disposed at the second end of the length of the elastic material and having a cross sectional area that is at least 10% smaller than the third cross sectional area and at least 20% larger than the fourth cross-sectional area, and which is configured for insertion into the second multi-width aperture structure through the third cross-sectional area and retention by the second multi-width aperture structure by the fourth cross-sectional area.

11. The container structure of claim 10, further comprising an elastic cord or band structure corresponding to each of the first closure mechanisms, the elastic cord or band element structure comprising:
  a predetermined length of elastic cord or band having a first end portion and a second end portion, the first end portion securely retained by or coupled to a predetermined container structure sidewall and extending outwardly through the predetermined container structure sidewall into container structure's external environment; and
  a first knob element disposed at a second end portion of the length of elastic material in the container structure's external environment, and having a cross sectional area that is at least 10% smaller than the first cross sectional area and at least 20% larger than the second cross sectional area, and which is configured for insertion into a first multi-width aperture structure through the first cross-sectional area and retention by the first multi-width aperture structure by the second cross-sectional area.

12. The container structure of claim 1, further comprising a second machine readable code disposed on an exterior surface of the container structure that indicates or encodes a target destination address to which the container structure is to be transferred by the aerial drone, wherein the target destination address comprises a target destination aerial drone landing pad (ADLP) address comprising current or most-recent 2D or 3D geospatial location data for the target destination ADLP plus an as-manufactured ADLP serial number.

* * * * *